United States Patent
Kim et al.

(10) Patent No.: US 11,084,898 B2
(45) Date of Patent: Aug. 10, 2021

(54) SELECTIVE BONDING METHOD OF POLYMER SUBSTRATES

(71) Applicant: Daegu Gyeongbuk Institute of Science & Technology, Daegu (KR)

(72) Inventors: So Hee Kim, Daegu (KR); Nam Sun Chou, Seoul (KR); Hyun Min Moon, Daegu (KR)

(73) Assignee: DAEGU GYEONGBUK INSTITUTE OF SCIENCE & TECHNOLOGY, Daegu (KR)

(*) Notice: Subject to any disclaimer, the term of this patent is extended or adjusted under 35 U.S.C. 154(b) by 283 days.

(21) Appl. No.: 15/926,447

(22) Filed: Mar. 20, 2018

(65) Prior Publication Data

US 2018/0273678 A1    Sep. 27, 2018

(30) Foreign Application Priority Data

Mar. 21, 2017  (KR) .................. 10-2017-0035621
May 16, 2017  (KR) .................. 10-2017-0060626

(51) Int. Cl.

| | | |
|---|---|---|
| C08G 61/02 | (2006.01) | |
| B32B 27/28 | (2006.01) | |
| C08L 65/04 | (2006.01) | |
| C08L 83/04 | (2006.01) | |
| B32B 15/08 | (2006.01) | |
| C09J 5/02 | (2006.01) | |

(52) U.S. Cl.
CPC ............ *C08G 61/025* (2013.01); *B32B 15/08* (2013.01); *B32B 27/283* (2013.01); *C08L 65/04* (2013.01); *C08L 83/04* (2013.01); *C09J 5/02* (2013.01); *C08G 2261/3424* (2013.01); *C09J 2483/006* (2013.01); *C09J 2483/008* (2013.01)

(58) Field of Classification Search
CPC .......... C08G 61/025; C08G 2261/3424; B32B 15/08; C08L 65/04; C08L 83/04; C09J 5/02; C09J 2483/006; C09J 2483/008
See application file for complete search history.

(56) References Cited

FOREIGN PATENT DOCUMENTS

KR    10-2013-0041720 A    4/2013

OTHER PUBLICATIONS

Rezai et al. "Plasma enhanced bonding of polydimethylsiloxane with parylene and its optimization" J. Micromech. Microeng. 21 (2011) 1-13.*

* cited by examiner

*Primary Examiner* — Robert S Walters, Jr.
(74) *Attorney, Agent, or Firm* — Lex IP Meister, PLLC

(57) ABSTRACT

The present invention provides a selective bonding method of polymer substrates. The present invention allows selective interfacial bonding between a polymer substrate and a parylene layer by using a mask pattern and plasma treatment, and enables the formation of a three-dimensional structure by injecting a fluid into a non-bonded area.

19 Claims, 9 Drawing Sheets

| No. | Name | Method | Note |
|---|---|---|---|
| A | No bonding | O₂ plasma 20min | |
| B | Weak bonding | O₂/N₂ plasma 20min | # of samples: 5 |
| C | Strong bonding | O₂/N₂ plasma 40min | |

SELECTIVE BONDING METHOD OF POLYMER SUBSTRATES

CROSS-REFERENCE TO RELATED APPLICATION

This application claims priority to and the benefit of Korean Patent Application No. 10-2017-0035621, filed on Mar. 3, 2017 and No. 10-2017-0060626, filed on May 16, 2017, the disclosure of which is incorporated herein by reference in its entirety.

BACKGROUND OF THE INVENTION

Field of the Invention

The present invention relates to a selective bonding method of polymer substrates, more particularly to a selective bonding method of polymer substrates, a method for manufacturing a three-dimensional structure using the same, and a three-dimensional structure manufactured thereby.

Description of the Related Art

The technology of bonding substrates made of different materials is useful in many applications. In particular, in the field of microfluid and nanofluid, the technology of manufacturing a heterojunction microfluidic element using materials having different properties is very important for improving the diversity of materials constituting the element and the functionality of the product. In addition, the technology allows to manufacture elements with high completeness and reproducibility, and increase the yield and lower the production cost in development of products for commercialization. However, the bonding technology for the manufacture of micro elements still has room for development.

Due to the development of new elements based on a variety of materials, the importance of the bonding technology to manufacture them is increasing. However, the bonding technologies that have been used so far have limitations in the materials that can be utilized. Also, the technologies require the use of an additional adhesive or an adhesive layer.

FIG. 1 is a schematic view showing an interlayer bonding method according to prior art.

FIG. 1 is a schematic view showing the process of PDMS (including Si)-metal bonding. With reference to FIG. 1, a metal substrate is treated with $O_2$ plasma and then with APTES (aminopropyltriethoxysilane). Then, a soft substrate (for example, PDMS) is treated with $O_2$ plasma. Then, the metal substrate and the soft substrate are reacted and bonded with each other at room temperature.

FIG. 2 is a schematic view showing another interlayer bonding method according to prior art.

FIG. 2 is a schematic view showing the process of rubber (without Si)-metal bonding. With reference to FIG. 2, a metal substrate is treated with $O_2$ plasma and then with APTES. Then, a soft substrate (for example, rubber) is treated with $O_2$ plasma and then with APTES. Then, the metal substrate and the soft substrate are reacted and bonded with each other at room temperature.

FIG. 3 is a schematic view showing another interlayer bonding method according to prior art.

FIG. 3 is a schematic view showing the process of PDMS-thermoplastic bonding. With reference to FIG. 3, a substrate made of thermoplastic (substrate without Si) is subjected to aminosilane treatment. Then, the substrate may be reacted with epoxy-terminated low-molecular-weight PDMS at 80° C. for 4 hours to perform PDMS-thermoplastic bonding.

These conventional interlayer bonding technologies directly apply a specific material or energy to the interfaces to be bonded, which poses a great risk of deteriorating the performance of the element and damaging the surfaces. In addition, it is difficult to perform selective interfacial bonding. Further, in these technologies, the two surfaces to be bonded need to be directly bonded with each other after energy treatment, which makes the process inconvenient.

CITATION LIST

Patent Literature

Patent Literature 1:
Korean Patent Laid-Open No. 10-2013-0041720

SUMMARY OF THE INVENTION

An objective of the present invention is to provide a bonding method of polymer substrates that allows bonding without damaging the element.

Another object of the present invention is to provide a selective bonding method of polymer substrates that allows to selectively bond interfaces in a desired pattern.

Yet another object of the present invention is to provide a method for manufacturing a three-dimensional structure using the selective bonding method of polymer substrates according to the present invention, and a three-dimensional structure manufactured by the same.

Objects of the present invention are not limited to the objects described above, and other objects that are not described will be clearly understood by a person skilled in the art from the description below.

In order to achieve the above objectives, one aspect of the present invention provides a selective bonding method of polymer substrates. The selective bonding method of polymer substrates may comprise the steps of: sequentially forming a first polymer substrate and a first parylene layer on a carrier substrate; forming a second polymer substrate on the first parylene layer; forming a mask pattern on the second polymer substrate; applying plasma treatment on the second polymer substrate on which the mask pattern is formed; removing the mask pattern; and removing the carrier substrate.

At this time, the first parylene layer area located under the mask pattern becomes a non-bonded area that is not bonded to the second polymer substrate, and the first parylene layer area located under the area other than that of the mask pattern becomes a bonded area that is bonded to the second polymer substrate by the plasma treatment.

The method may further comprise, after the step of removing the carrier substrate, injecting a fluid between the non-bonded area of the first parylene layer area and the second polymer substrate.

In addition, the first polymer substrate or the second polymer substrate may comprise a silicon-based elastomer material.

In addition, the silicon-based elastomer material is polydimethylsiloxane (PDMS).

Further, the plasma treatment is $O_2$ and $N_2$ plasma treatment.

In order to achieve the above objectives, another aspect of the present invention provides a selective bonding method of polymer substrates. The selective bonding method of polymer substrates may comprise the steps of: sequentially forming a first polymer substrate, a first parylene layer and a first electrode pattern on a carrier substrate; forming a second polymer substrate, a second parylene layer and a second electrode pattern on the first parylene layer on which the first electrode pattern is formed; removing the area of the second parylene layer other than that under the second electrode pattern; forming a mask pattern on the second polymer substrate to cover the second electrode pattern; applying plasma treatment on the second polymer substrate on which the mask pattern is formed; removing the mask pattern; and removing the carrier substrate.

At this time, the first parylene layer area located under the mask pattern becomes a non-bonded area that is not bonded to the second polymer substrate, and the first parylene layer area located under the area other than that of the mask pattern becomes a bonded area that is bonded to the second polymer substrate by the plasma treatment.

The method may further comprise, after the step of removing the carrier substrate, injecting a fluid between the non-bonded area of the first parylene layer area and the second polymer substrate.

In addition, the first polymer substrate or the second polymer substrate may comprise a silicon-based elastomer material.

In addition, the silicon-based elastomer material is polydimethylsiloxane (PDMS).

Further, the plasma treatment is $O_2$ and $N_2$ plasma treatment.

In order to achieve the above objectives, another aspect of the present invention provides a method for manufacturing a three-dimensional structure. The method for manufacturing a three-dimensional structure comprises the steps of: preparing a structure comprising a first polymer substrate/first parylene layer/second polymer substrate structure, wherein the first parylene layer comprises a non-bonded area that is not bonded to the second polymer substrate and a bonded area that is bonded to the second polymer substrate; and injecting a fluid between the non-bonded area of the first parylene layer and the second polymer substrate, wherein a hollow is formed between the non-bonded area of the first parylene layer and the second polymer substrate by the fluid injection to form a three-dimensional structure.

In addition, the step of preparing the structure may comprise the steps of: sequentially forming a first polymer substrate and a first parylene layer on a carrier substrate; forming a second polymer substrate on the first parylene layer; forming a mask pattern on the second polymer substrate; applying plasma treatment on the second polymer substrate on which the mask pattern is formed; removing the mask pattern; and removing the carrier substrate.

In addition, the first polymer substrate or the second polymer substrate may comprise a silicon-based elastomer material.

In addition, the silicon-based elastomer material is polydimethylsiloxane (PDMS).

Further, the plasma treatment is $O_2$ and $N_2$ plasma treatment.

Further, the first parylene layer is a first parylene layer on which a first electrode pattern is formed.

Further, the second polymer substrate is a second polymer substrate on which a patterned second parylene layer and a second electrode pattern located on the patterned second parylene layer are formed.

In order to achieve the above objectives, another aspect of the present invention provides a three-dimensional structure. The three-dimensional structure comprises a first polymer substrate, a first parylene layer located on and bonded to the first polymer substrate, and a second polymer substrate located on the first parylene layer, wherein the first parylene layer comprises a non-bonded area that is not bonded to the second polymer substrate and a bonded area that is bonded to the second polymer substrate, and wherein the structure has a hollow formed by fluid injection between the non-bonded area of the first parylene layer and the second polymer substrate.

In order to achieve the above objectives, another aspect of the present invention provides a three-dimensional structure. The three-dimensional structure comprises a first polymer substrate, a first parylene layer located on and bonded to the first polymer substrate and on which a first electrode pattern is formed, and a second polymer substrate located on the first parylene layer and on which a second electrode pattern is formed, wherein one area of the first parylene layer is a non-bonded area that is not bonded to the second polymer substrate and other area of the first parylene layer other than the non-bonded area is a bonded area that is bonded to the second polymer substrate, and wherein the structure has a hollow formed by fluid injection between the non-bonded area of the first parylene layer and the second polymer substrate.

Further, the one area of the first parylene layer includes the area of the first electrode pattern.

In order to achieve the above objectives, another aspect of the present invention provides a three-dimensional structure. The three-dimensional structure may be manufactured by the above-mentioned method for manufacturing a three-dimensional structure.

DETAILED DESCRIPTION OF THE PREFERRED EMBODIMENTS

Figure 1:
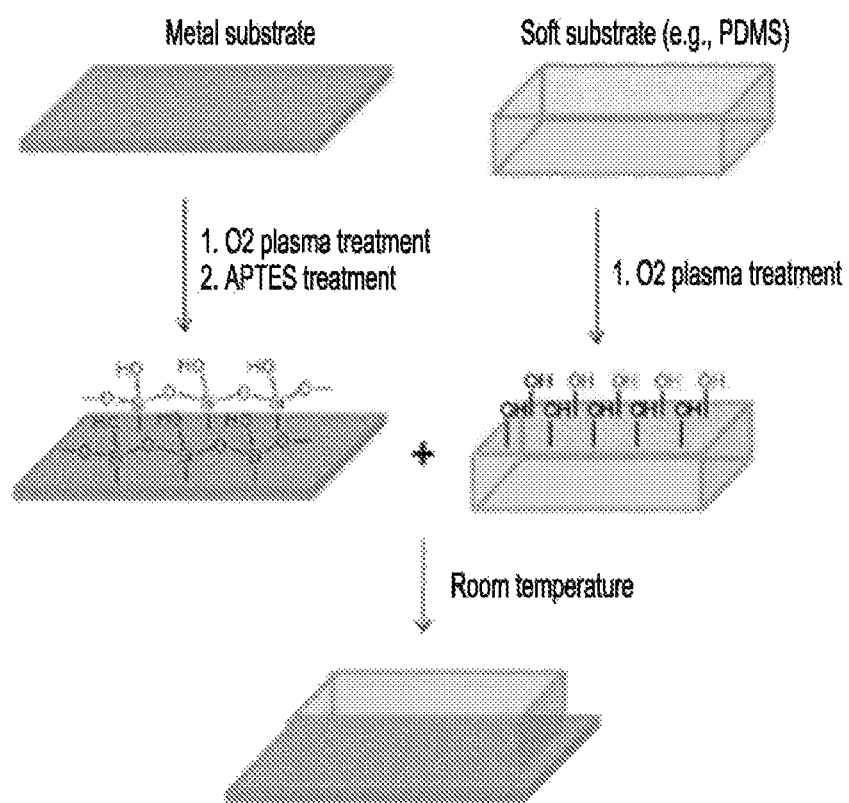
FIG. 1 is a schematic view showing an interlayer bonding method according to prior art.
Figure 2:
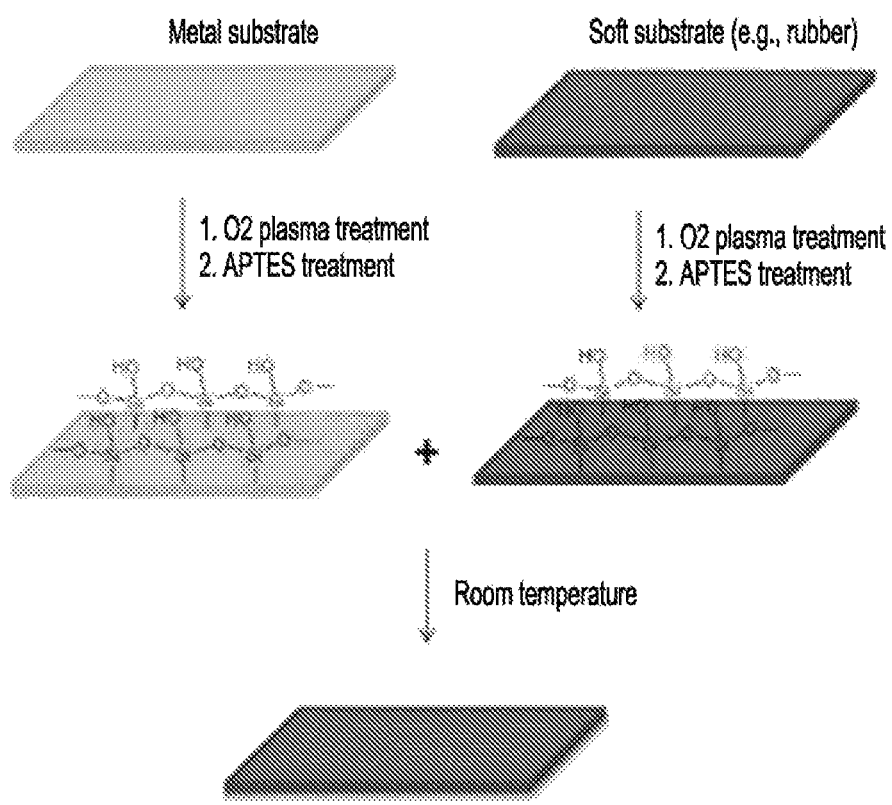
FIG. 2 is a schematic view showing another interlayer bonding method according to prior art.
Figure 3:
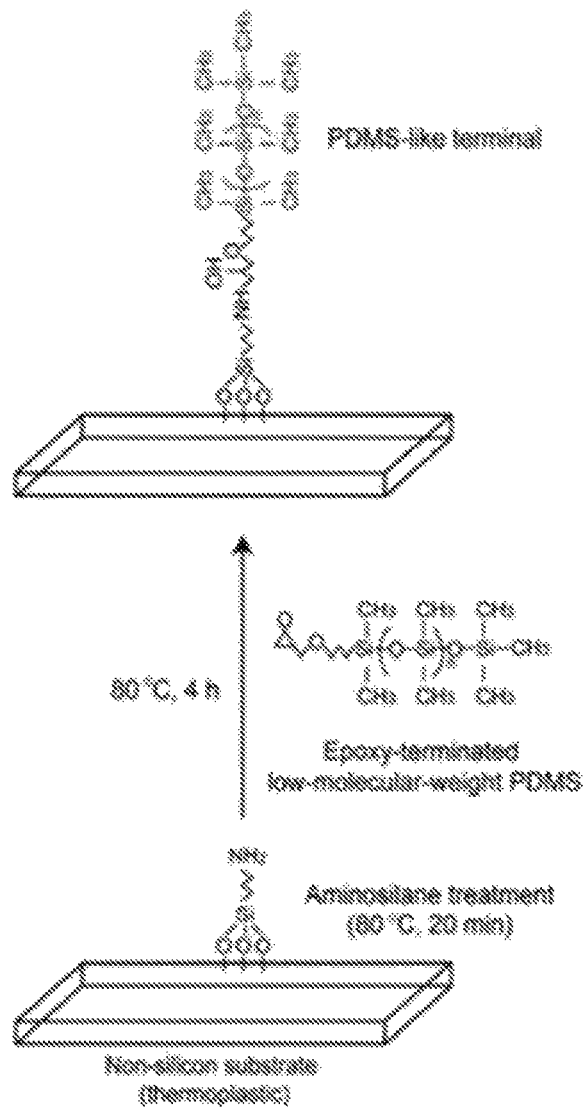
FIG. 3 is a schematic view showing yet another interlayer bonding method according to prior art.

Hereinafter, the present invention will be described with reference to the accompanying drawings. The present invention may, however, be embodied in many different forms and should not be construed as limited to the embodiments set forth herein. In order to clearly illustrate the present invention, parts not related to the description are omitted, and like parts are denoted by like reference numerals throughout the specification.

Although the terms "first," "second," "A," "B," etc. may be used herein to describe various components, the components should not be limited by these terms. These terms are only used to distinguish one component from another. For example, a first component may be termed a second component, and likewise, a second component may be termed a first component, without departing from the scope of the present invention. The term "and/or" covers a combination of a plurality of related listed items or any one of a plurality of related listed items.

Herein, when a part is described as being "connected" or "coupled" to another part, it may be directly connected or coupled to another part or may be indirectly connected or coupled to another part with a member interposed therebetween. Further, the terms "comprise" and "include" as used herein refer to the presence of the corresponding component and is not intended to exclude additional components, unless otherwise specified.

The terms as used herein are for the purpose of describing particular embodiments only and are not intended to limit the invention. As used herein, the singular forms "a," "an" and "the" are intended to include the plural forms as well, unless the context clearly indicates otherwise. It is to be further understood that the terms "comprise," "include" and "have" as used herein specify the presence of stated features, numbers, steps, actions, components, parts, or a combination thereof, but do not preclude the presence or addition of one or more other features, numbers, steps, actions, components, parts, or a combination thereof.

Herein, when an element or a layer is described as being "on" another element or layer, it may be directly on another element or layer or another layer or element may be interposed therebetween. On the other hand, when an element or a layer is "directly on" another element or layer, there is no layer or element interposed therebetween.

The term "A/B/C multilayer structure" as used herein refers to a structure in which a B layer and a C layer are sequentially disposed on an A layer.

Hereinafter, a selective bonding method of polymer substrates according to one embodiment of the present invention will be described.

The selective bonding method of polymer substrates may comprise the steps of: sequentially forming a first polymer substrate and a first parylene layer on a carrier substrate; forming a second polymer substrate on the first parylene layer; forming a mask pattern on the second polymer substrate; applying plasma treatment on the second polymer substrate on which the mask pattern is formed; removing the mask pattern; and removing the carrier substrate.

Thus, the first parylene layer area located under the mask pattern becomes a non-bonded area that is not bonded to the second polymer substrate, and the first parylene layer area located under the area other than that of the mask pattern becomes a bonded area that is bonded to the second polymer substrate by the plasma treatment.

Thus, plasma is applied to the area of the uppermost layer of the substrate other than that of the mask pattern, so that energy is indirectly transferred to the contact interface between the first parylene layer and the second polymer substrate, whereby only a desired site can be selectively bonded.

With reference to FIG. 4 to FIG. 10, a selective bonding method of polymer substrates according to one embodiment of the present invention will be described in detail.

FIG. 4 to FIG. 10 are schematic cross-sectional views showing the process steps of a selective bonding method of polymer substrates according to one embodiment of the present invention.

Figure 4:
FIG. 4 to FIG. 10 are schematic cross-sectional views showing the process steps of a selective bonding method of polymer substrates according to one embodiment of the present invention.

With reference to FIG. 4, a first polymer substrate 200 and a first parylene layer 300 may be sequentially formed on a carrier substrate 100.

Here, the carrier substrate 100 serves as a supporting substrate. For example, the carrier substrate 100 may include a glass substrate, a metal substrate, or a plastic substrate.

The first polymer substrate 200 may be made of a flexible polymer material. For example, the first polymer substrate 200 may comprise an elastomer. The elastomer may be, for example, a silicon-based elastomer material. A specific example of the silicon-based elastomer material may be polydimethylsiloxane (PDMS).

For example, the first polymer substrate 200 may be formed on the carrier substrate 100 by spin coating a PDMS material. Then, parylene may be deposited on the first polymer substrate 200 to form the first parylene layer 300.

Figure 5:
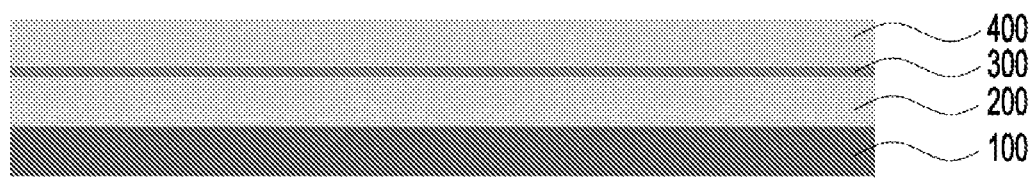

With reference to FIG. 5, a second polymer substrate 400 may be formed on the first parylene layer 300.

The second polymer substrate 400 may be made of a flexible polymer material. For example, the second polymer substrate 400 may comprise an elastomer. The elastomer may be, for example, a silicon-based elastomer material. A specific example of the silicon-based elastomer material may be PDMS.

Figure 6:
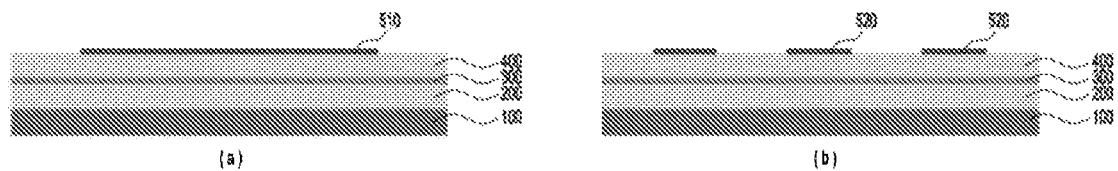

With reference to FIG. 6, mask patterns 510 and 520 may be formed on the second polymer substrate 400. FIG. 6(a) and FIG. 6(b) show different embodiments of the mask pattern.

The mask patterns 510 and 520 allow the bonding of a selected area only in the process of the interlayer bonding between the first parylene layer 300 and the second polymer substrate 400 by the plasma treatment which will be described later. The mask patterns 510 and 520 can form various patterns.

The mask patterns 510 and 520 may be made of any material capable of masking plasma. For example, the mask patterns 510 and 520 may be made of a photoresist material, a plastic film, or a metal plate.

Figure 7:
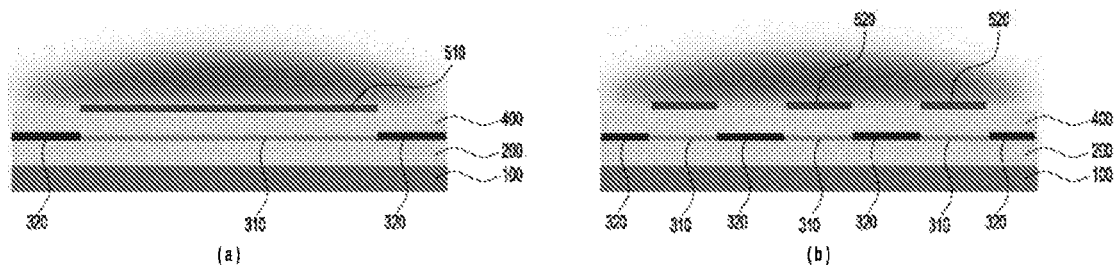

With reference to FIG. 7, plasma treatment may be applied on the second polymer substrate 400 on which the mask patterns 510 and 520 are formed, to perform interlayer bonding.

Further, in order to achieve stronger interlayer bonding, a heating process may be further performed after plasma treatment.

Here, the plasma may be $O_2$ and $N_2$ plasma.

When the plasma is applied, a diffusion phenomenon occurs between the first parylene layer 300 and the polymer (elastomer) of the second polymer substrate 400, so that a new adhesive layer is formed at the contact interface between the two layers. This results in the formation of a strong bond between the two layers, leading to bonding.

Thus, when plasma treatment is applied on the second polymer substrate 400 on which the mask patterns 510 and 520 are formed, the first parylene layer area located under the mask patterns 510 and 520 becomes a non-bonded area 310, and the first parylene layer area located under the area other than that of the mask patterns 510 and 520, where the second polymer substrate is exposed, receives the indirect energy of the plasma to become a bonded area 320 that is bonded to the second polymer substrate 400. It can be interpreted that a new adhesive layer is formed at the contact interface between the first parylene layer and the second polymer substrate, as described above, in the bonded area 320 of the first parylene layer.

Thus, the mask patterns mask plasma, and plasma treatment is selectively applied on the area where the mask pattern is not formed, which results in the selective formation of a bonded area between the parylene layer and the second polymer substrate.

In addition, the adhesive strength of polymer substrates was evaluated with varying plasma power and the flow rate of the injected gases $O_2$ and $N_2$.

The bonding grade was evaluated with varying the $O_2$ flow rate while the $N_2$ flow rate was fixed at 200 sccm. The result showed that the best adhesion properties were obtained when the $O_2$ flow rate was 10 sccm. Further, the most excellent bonding grade was achieved when the $O_2$ flow rate was between 10 sccm and 20 sccm.

In addition, the bonding grade was evaluated with varying the $N_2$ flow rate while the $O_2$ flow rate was fixed at 10 sccm. The result showed that the best adhesion properties were obtained when the $N_2$ flow rate was 150 sccm. Further, the most excellent bonding grade was achieved when the $N_2$ flow rate was between 100 sccm and 200 sccm.

In addition, the bonding grade was evaluated with varying plasma power of 50 W, 100 W, 150 W and 200 W. The result showed the most excellent adhesive strength was obtained at 100 W and 150 W. When the plasma power is 200 W, an area larger than the masked part reacts, resulting in over-bonding.

Figure 8:
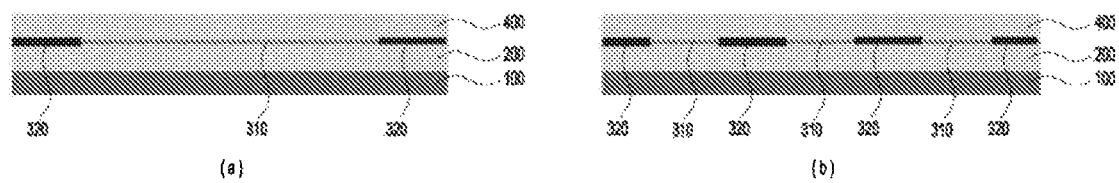

With reference to FIG. 8, the mask patterns 510 and 520 may be removed. The mask patterns may be removed by various known methods such as wet or dry etching methods.

Figure 9:
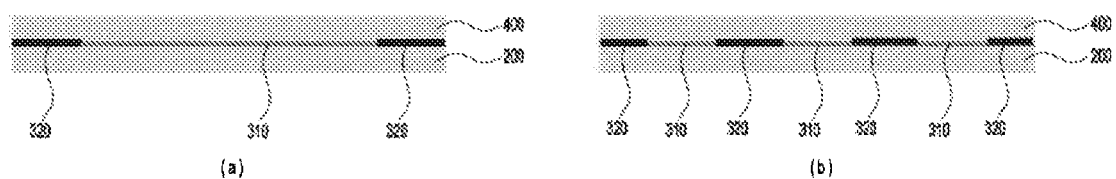

With reference to FIG. 9, the carrier substrate 100 may be removed and separated from the substrate. The removal of the carrier substrate 100 may be performed by mechanical methods such as peeling the elements from carrier substrate 100.

Figure 10:
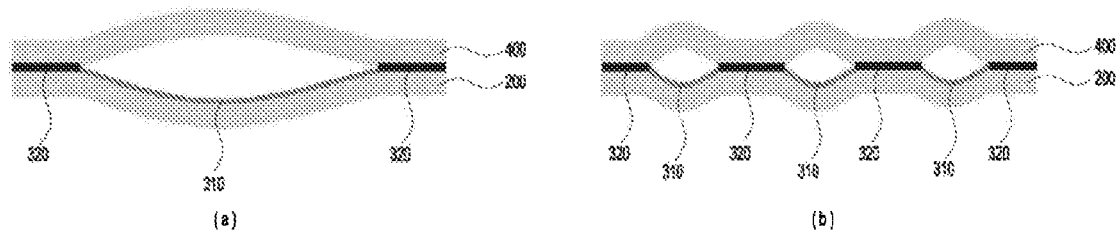

With reference to FIG. 10, after the step of removing the carrier substrate 100, a fluid may be injected between the non-bonded area 310 of the parylene layer 300 area and the second polymer substrate 400.

Thus, a hollow can be formed between the non-bonded area 310 of the first parylene layer 300 area and the second polymer substrate 400 by the injection of a fluid, resulting in the formation of a three-dimensional structure. For example, the fluid may be air or a liquid.

A selective bonding method of polymer substrates according to another embodiment of the present invention will be described below.

The selective bonding method of polymer substrates according to another embodiment of the present invention may comprise the steps of: sequentially forming a first polymer substrate, a first parylene layer and a first electrode pattern on a carrier substrate; forming a second polymer substrate, a second parylene layer and a second electrode pattern on the first parylene layer on which the first electrode pattern is formed; removing the area of the second parylene layer other than that under the second electrode pattern; forming a mask pattern on the second polymer substrate to cover the second electrode pattern; applying plasma treatment on the second polymer substrate on which the mask pattern is formed; removing the mask pattern; and removing the carrier substrate.

The step of removing the area of the second parylene layer other than that under the second electrode pattern may be performed, for example, by $O_2$ plasma etching treatment.

Thus, the first parylene layer area located under the mask pattern becomes a non-bonded area that is not bonded to the second polymer substrate, and the first parylene layer area located under the area other than that of the mask pattern becomes a bonded area that is bonded to the second polymer substrate by the plasma treatment.

In addition, the method may further comprise, after the step of removing the carrier substrate, injecting a fluid between the non-bonded area of the first parylene layer area and the second polymer substrate.

Here, the first polymer substrate or the second polymer substrate may comprise a silicon-based elastomer material. For example, the silicon-based elastomer material may be PDMS.

Further, the plasma treatment is $O_2$ and $N_2$ plasma treatment. When $O_2$ plasma treatment and $N_2$ plasma treatment each are individually applied, no adhesive strength is generated between the first parylene layer and the second polymer substrate, and when $O_2$ plasma treatment and $N_2$ plasma treatment are applied together, an adhesive strength is generated between the first parylene layer and the second polymer substrate.

Figure 11:
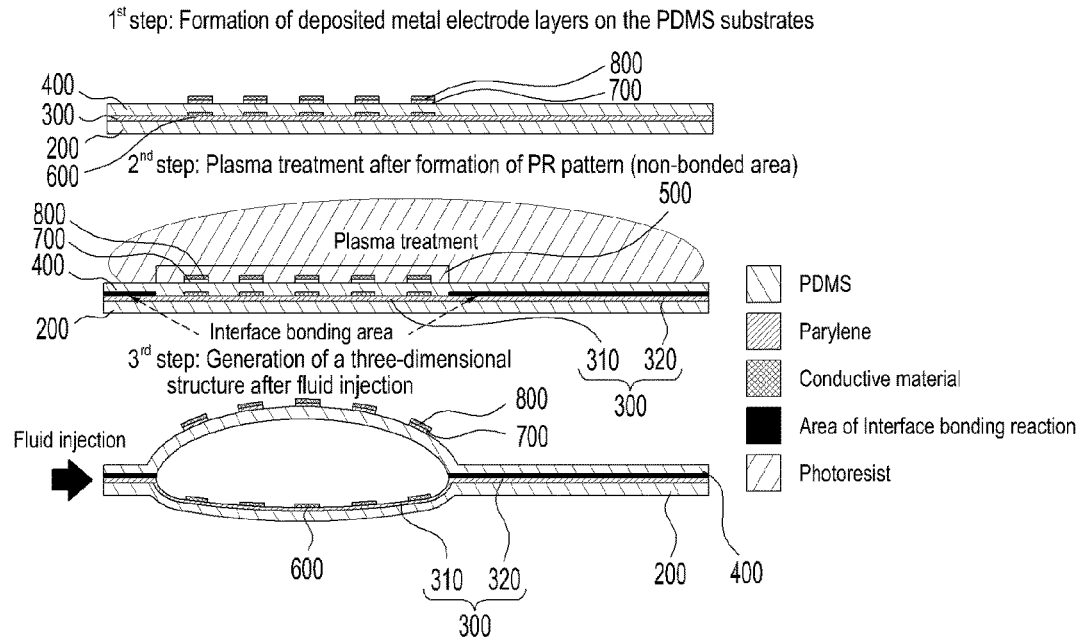
FIG. 11 shows a selective bonding method of polymer substrates according to one embodiment of the present invention.

FIG. 11 shows a selective bonding method of polymer substrates according to one embodiment of the present invention.

With reference to FIG. 11, the metal patterns of PDMS substrates are formed by deposition and patterning of metal electrode layers.

That is, parylene is deposited on a first polymer substrate 200 to form a first parylene layer 300, and a first electrode pattern 600 is formed on the first parylene layer 300.

A second polymer substrate 400 on which a patterned second parylene layer 700 and a second metal pattern 800 formed on the patterned second parylene layer 700 are formed on the first polymer substrate 200.

Here, the first polymer substrate 200 and the second polymer substrate 400 are made of a PDMS material. The first electrode pattern 600 and the second electrode pattern 800 are metal patterns comprising a conductive material.

The first electrode pattern 600 area and the second electrode pattern 800 area may be disposed at positions corresponding to each other.

Then, a photoresist pattern is formed on the part which is to be left as a non-bonded area (area which is not to be bonded) between the first parylene layer 300 and the second polymer substrate 400, using a mask pattern 500. Then, plasma treatment is applied. In FIG. 11, a mask pattern was formed such that the area including the first electrode pattern 600 was left as a non-bonded area.

Thus, the indirect energy from the plasma treatment is transferred to the interface between the first parylene layer 300 area under the area other than that of the mask pattern 500 and the second polymer substrate 400, which causes a diffusion phenomenon between the parylene and the elastomer. As a result, a new adhesive layer is formed between the two layers, leading to bonding.

Thus, the first parylene layer 300 area located under the area other than that of the mask pattern 500 becomes a bonded area 310 that is bonded to the second polymer substrate 400. That is, the bonded area 310, which is an area of interface bonding reaction, is selectively formed between the first parylene layer 300 and the second polymer substrate 400 located thereon.

In addition, the first parylene layer 300 area located under the mask pattern 500 becomes a non-bonded area 320 that is not bonded to the second polymer substrate 400 located thereon.

Then, a three-dimensional structure may be formed through fluid injection between the first parylene layer's non-bonded area 310 and the second polymer substrate 400 located thereon.

Thus, it is possible to bond only a desired site without a direct treatment of the contact surface of two polymer substrates, by, after completion of all the two-dimensional processes such as metal patterning and sensor fabrication, selectively applying $O_2$ and $N_2$ plasma to the uppermost layer of a substrate to indirectly transfer energy to the contact interface (interface of the first parylene layer and the second polymer substrate) between two layers.

In some cases, the first electrode pattern 600 and the second electrode pattern 700 may be formed in the bonded area or the non-bonded area.

In some cases, one selected from the first electrode pattern 600 and the second electrode pattern 700 may be formed.

A method for manufacturing a three-dimensional structure according to another embodiment of the present invention will be described below.

The method for manufacturing a three-dimensional structure according to another embodiment of the present invention may comprise the steps of: preparing a structure comprising a first polymer substrate/first parylene layer/second polymer substrate structure, wherein the first parylene layer comprises a non-bonded area that is not bonded to the second polymer substrate and a bonded area that is bonded to the second polymer substrate; and injecting a fluid between the non-bonded area of the first parylene layer and the second polymer substrate, wherein a hollow is formed between the non-bonded area of the first parylene layer and the second polymer substrate by the fluid injection to form a three-dimensional structure.

The step of preparing the structure may be performed by the selective bonding method of polymer substrates according to one embodiment of the present invention.

For example, the step of preparing the structure may comprise the steps of: sequentially forming a first polymer substrate and a first parylene layer on a carrier substrate; forming a second polymer substrate on the first parylene layer; forming a mask pattern on the second polymer substrate; applying plasma treatment on the second polymer substrate on which the mask pattern is formed; removing the mask pattern; and removing the carrier substrate.

Here, the first polymer substrate or the second polymer substrate may comprise a silicon-based elastomer material. For example, the silicon-based elastomer material is PDMS.

Further, the plasma treatment is $O_2$ and $N_2$ plasma treatment.

On the other hand, an electrode pattern may be provided on the first parylene layer or the second polymer substrate. For example, the first parylene layer may be a parylene layer on which a first electrode pattern is formed. For example the second polymer substrate may be a polymer substrate on which a patterned second parylene layer and a second electrode pattern located on the patterned second parylene layer are formed. For example, the first parylene layer may be a parylene layer on which a first electrode pattern is formed, and the second polymer substrate may be a polymer substrate on which a patterned second parylene layer and a second electrode pattern located on the patterned second parylene layer are formed. Thus, the three-dimensional structure may be a three-dimensional electrode structure.

Since the first polymer substrate or the second polymer substrate of the three-dimensional structure is made of an elastomer material, the first polymer substrate or the second polymer substrate can be deformed by fluid injection to form a three-dimensional structure having a hollow therein. Further, it is possible to provide a three-dimensional structure in which the hollow shape changes according to the amount of the pressure existing outside.

Figure 12:
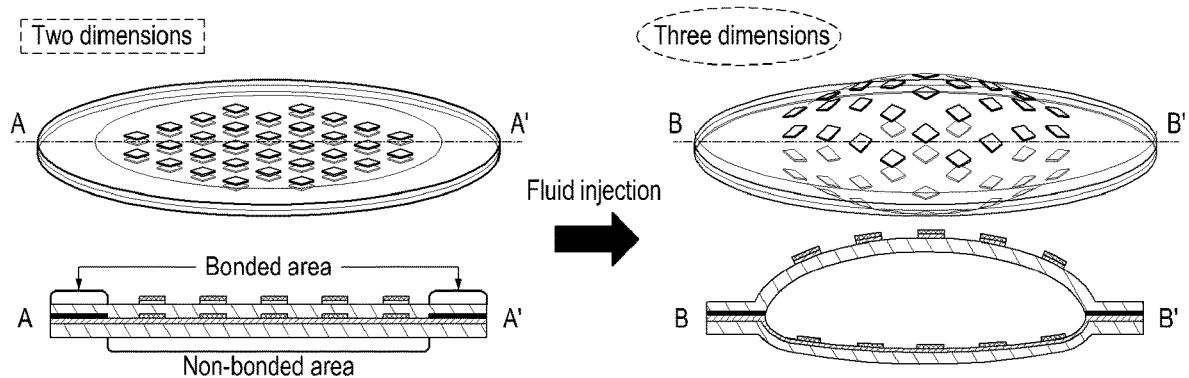
FIG. 12 is a conceptual view showing the technology of fabricating the three-dimensional structure manufactured using a selective bonding method of polymer substrates according to one embodiment of the present invention.

FIG. 12 is a conceptual view showing the technology of fabricating the three-dimensional structure manufactured using a selective bonding method of polymer substrates according to one embodiment of the present invention.

With reference to FIG. 12, a two-dimensional structure is manufactured by selectively bonding polymer substrates according to the present invention. Thus, this two-dimensional structure has a bonded area and a non-bonded area between the two polymer substrates.

Thus, it is possible to manufacture a three-dimensional structure by injecting a fluid into the non-bonded area between the two polymer substrates.

Figure 13:
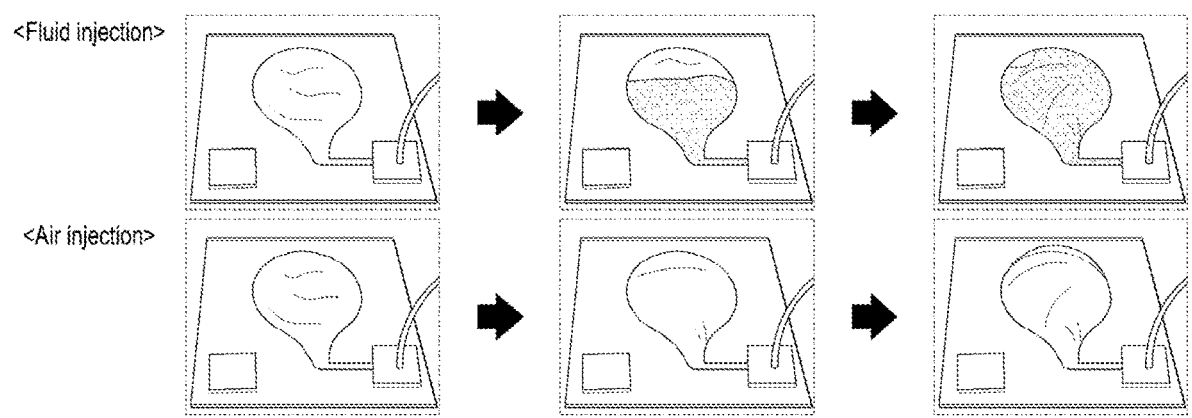
FIG. 13 shows the images of the manufacture of a three-dimensional structure using a selective bonding method of polymer substrates according to one embodiment of the present invention.

FIG. 13 shows the images of the manufacture of a three-dimensional structure using a selective bonding method of polymer substrates according to one embodiment of the present invention.

First, a first polymer substrate is formed on a carrier substrate by spin coating PDMS. A glass substrate is used as the carrier substrate. Then, parylene is deposited on the first polymer substrate to a thickness of 1 μm to form a first parylene layer, and 150 μm thick PDMS is coated thereon by spin coating to form a second polymer substrate. Finally, a mask pattern is formed on the second polymer substrate and $O_2$ and $N_2$ plasma treatment is applied to perform selective bonding.

Then, in order to introduce fluid between the first parylene layer and the second polymer substrate, a PDMS block is attached to the outer surfaces of the first and second polymer substrates using $O_2$ plasma, and then a tube hole is punched and a tube is inserted. Finally, a syringe is connected to the inserted tube and a fluid is injected to manufacture a three-dimensional structure from the two-dimensional structure.

With reference to FIG. 13, it can be seen that a three-dimensional structure can be manufactured by injecting a fluid after performing the selective bonding of polymer substrates.

Test Example

Figure 14:
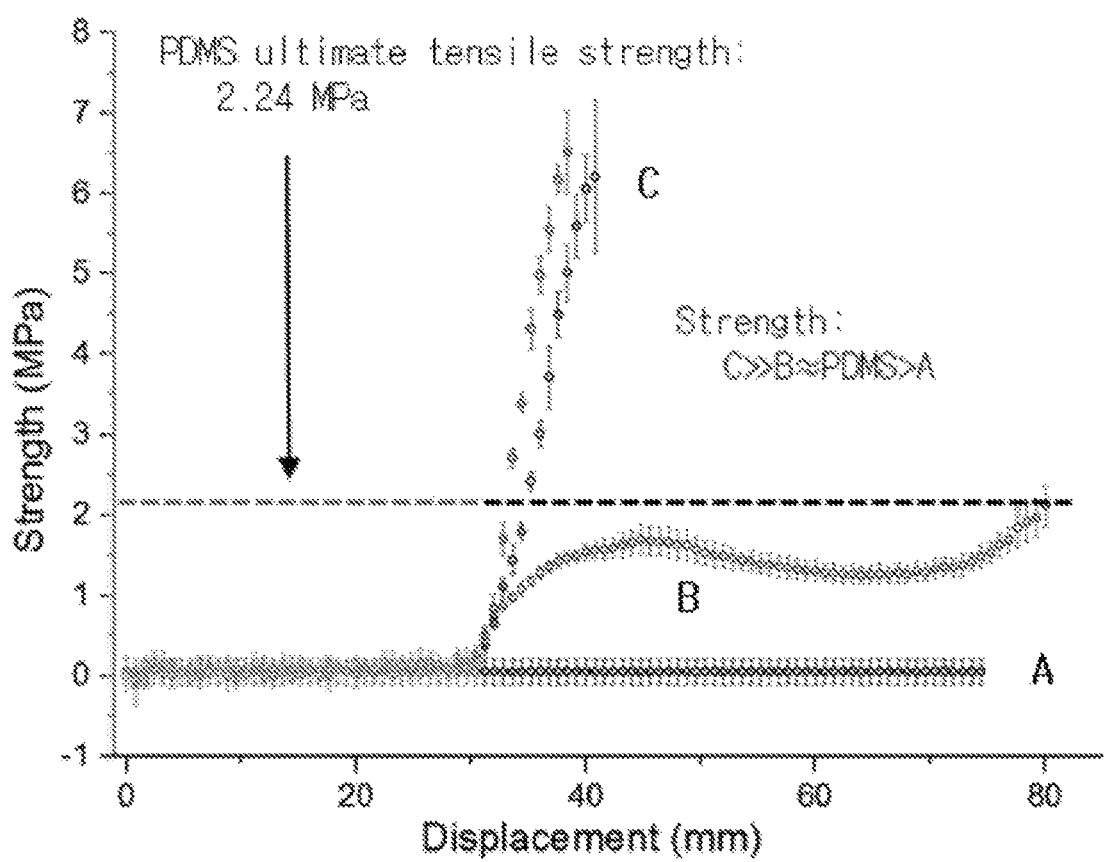
FIG. 14 and FIG. 15 show a graph of the results of a T peel test to examine the adhesive strength of the selective bonding of a polymer substrate, and the images of the test.
Figure 15:
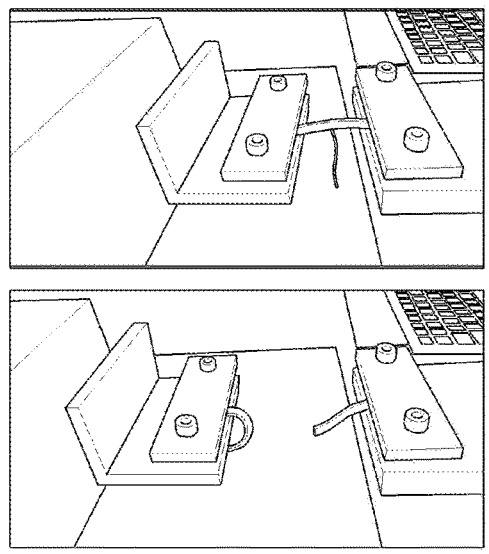

FIG. 14 and FIG. 15 show a graph of the results of a T peel test to examine the adhesive strength of the selective bonding of a polymer substrate, and the images of the test. With reference to FIG. 14 and FIG. 15, adhesive strength was measured for the following cases: at 100 W, (A) applying $O_2$ plasma treatment for 20 minutes, (B) applying $O_2/N_2$ plasma treatment for 20 minutes and (C) applying $O_2/N_2$ plasma treatment for 40 minutes. Five samples were measured for each case. The result showed that strong bonding occurred when $O_2/N_2$ plasma was applied for 40 minutes (case (C)).

Figure 16:
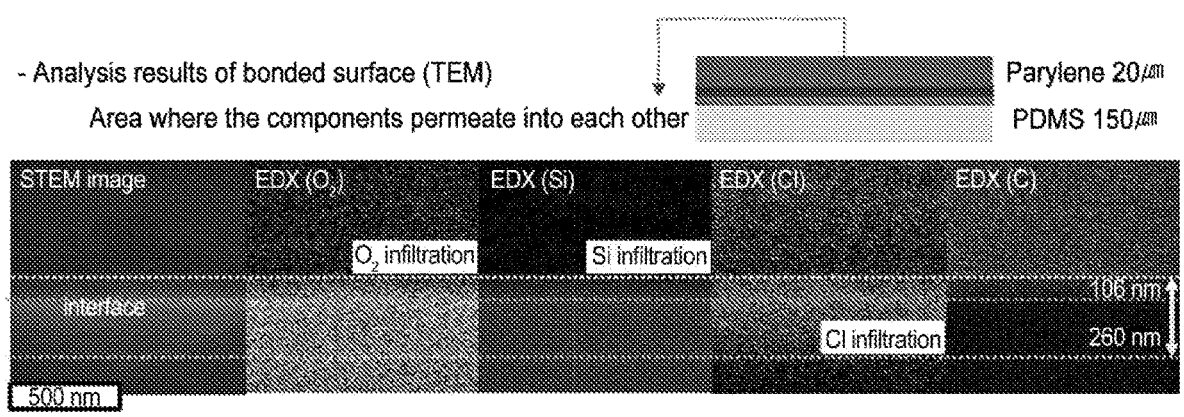
FIG. 16 is a TEM image of the bonded surface of the selective bonding of a polymer substrate according to the present invention.

FIG. 16 is a TEM image of the bonded surface of the selective bonding of a polymer substrate according to the present invention. With reference to FIG. 16, it is considered that PDMS has diffused or chemically bonded to the parylene area.

The present invention allows bonding without damaging the element because it enables to bond the interface by applying indirect energy.

In addition, the present invention allows to selectively bond interfaces in a desired shape using a mask pattern.

In addition, the present invention allows to manufacture a three-dimensional structure by expanding an element fabricated by a two-dimensional process to a three-dimensional structure, using MEMS technology. Thus, it can be applied to various fields such as medical engineering, machinery, and electronics.

That is, the three-dimensional structures manufactured by the selective bonding method of polymer substrates according to the present invention can be applied to various fields including electro-corticogram (ECoG) electrodes, capacitor type sensors for measurement of the intracranial pressure, drug delivery devices for inhibition of inflammation.

Conventional ECoG electrodes are of a flat type, and thus they are vulnerable inside the cranial bones due to the movement of the brain. However, an electrode with a fluid or air injected therein allows long-term insertion because it can be fixed between the cranial bones and the brain. In addition, while conventional ECoG electrodes are inserted after removing a large area of the cranial bones in order to position the electrodes, the proposed electrode can greatly reduce the insertion area by injecting a fluid or air after inserting the electrode.

In the case of capacitor type sensors for measurement of the intracranial pressure, it is possible to fix them between the cranial bones and the brain by manufacturing the electrodes as a capacitor array type and injecting a fluid or air into each electrode by using the selective bonding between PDMS and parylene. The pressure between the cranial bones generated due to the variation of the intracranial pressure changes the volume of the fluid or air chamber present in each electrode. The intracranial pressure can be measured by measuring this volume change with the capacitor type electrodes.

In the case of drug delivery devices for inhibition of inflammation, long-term insertion of electrodes causes an inflammatory reaction even if a biocompatible material is used, because it is a foreign material. This inflammatory response is a significant problem in the long-term measurement of biosignals. Thus, in the present invention, an inflammatory reaction inhibitor is injected into a fluid chamber and then the surface of PDMS, which is a porous material, is adjusted to allow quantitative drug delivery in vivo. The present invention also enables long-term biosignal measurement simultaneously with drug delivery.

The present invention enables to bond the interfaces to be bonded by applying indirect energy, and thus allows bonding without damaging the element.

In addition, the present invention allows to selectively bond interfaces in a desired shape using a mask pattern.

In addition, the present invention allows to manufacture a three-dimensional structure by expanding an element fabricated by a two-dimensional process to a three-dimensional structure, using MEMS technology. Thus, it can be applied to various fields such as medical engineering, machinery, and electronics.

It is to be understood that the effects of the present invention are not limited to the above-described effects, but include all effects that can be deduced from the detailed description of the present invention or the constitution of the invention described in the claims.

It will be understood by a person skilled in the art that the embodiments of the invention described herein are for illustrative purposes only, and that various changes may be made therein without departing from the spirit and scope of the present invention. It is therefore to be understood that the above-described embodiments are illustrative in all aspects and not restrictive. For example, each component described to be of a single type can be implemented in a distributed manner. Likewise, components described to be distributed can be implemented in a combined manner.

The scope of the present invention is defined by the appended claims, and all changes or modifications derived from the meaning and scope of the claims and their equivalents should be construed as being included within the scope of the present invention.

REFERENCE SIGNS LIST

100: carrier substrate
200: first polymer substrate
300: first parylene layer
310: non-bonded area
320: bonded area
400: second polymer substrate
500, 510, 520: mask pattern
600: first electrode pattern
700: second parylene layer
800: second electrode pattern

What is claimed is:

1. A selective bonding method of polymer substrates comprising:
    forming a first polymer substrate on a carrier substrate and forming a first parylene layer on the first polymer substrate;
    forming a second polymer substrate on the first parylene layer;
    forming a mask pattern on the second polymer substrate;
    applying plasma treatment on the second polymer substrate on which the mask pattern is formed;
    removing the mask pattern; and
    removing the carrier substrate.

2. The selective bonding method of polymer substrates according to claim 1,
    wherein an area at an interface between the first parylene layer and the second polymer substrate, which is located under the mask pattern, becomes a first area where the first parylene layer is not bonded to the second polymer substrate, and another area at the interface between the first parylene layer and the second polymer substrate, which is located under an area where the mask pattern is absent, becomes a second area where the first parylene layer is bonded to the second polymer substrate by the plasma treatment.

3. The selective bonding method of polymer substrates according to claim 2,
    wherein the method further comprises injecting a fluid into the first area formed between the first parylene layer and the second polymer substrate, after removing the carrier substrate.

4. The selective bonding method of polymer substrates according to claim 1,
    wherein the first polymer substrate or the second polymer substrate comprises a silicon-based elastomer material.

5. The selective bonding method of polymer substrates according to claim 4,
    wherein the silicon-based elastomer material is polydimethylsiloxane (PDMS).

6. The selective bonding method of polymer substrates according to claim 1,
    wherein the plasma treatment is $O_2$ and $N_2$ plasma treatment.

7. A selective bonding method of polymer substrates, the method comprising:
    forming a first polymer substrate on a carrier substrate, forming a first parylene layer on the first polymer substrate, and forming a first electrode pattern on the first parylene layer;

forming a second polymer substrate on the first parylene layer on which the first electrode pattern is formed, forming a second parylene layer on the second polymer substrate, and forming a second electrode pattern on the second parylene layer;

removing an area of the second parylene layer other than that under the second electrode pattern;

forming a mask pattern on the second polymer substrate to cover at least the second electrode pattern;

applying plasma treatment on the second polymer substrate on which the mask pattern is formed;

removing the mask pattern; and removing the carrier substrate.

8. The selective bonding method of polymer substrates according to claim 7, wherein an area at an interface between the first parylene layer and the second polymer substrate, which is located under the mask pattern, becomes a first area where the first parylene layer is not bonded to the second polymer substrate, and another area at the interface between the first parylene layer and the second polymer substrate, which is located under an area where the mask pattern is absent, becomes a second area where the first parylene layer is bonded to the second polymer substrate by the plasma treatment.

9. The selective bonding method of polymer substrates according to claim 8, wherein the method further comprises injecting a fluid into the first area formed between the first parylene layer and the second polymer substrate, after removing the carrier substrate.

10. The selective bonding method of polymer substrates according to claim 7, wherein the first polymer substrate or the second polymer substrate comprises a silicon-based elastomer material.

11. The selective bonding method of polymer substrates according to claim 10, wherein the silicon-based elastomer material is polydimethylsiloxane (PDMS).

12. The selective bonding method of polymer substrates according to claim 7, wherein the plasma treatment is $O_2$ and $N_2$ plasma treatment.

13. A method for manufacturing a three-dimensional structure, the method comprising:

preparing a structure comprising a first polymer substrate, a first parylene layer, and a second polymer substrate, wherein the structure comprises a first area at an interface between the first parylene layer and the second polymer substrate where the first parylene layer is not bonded to the second polymer substrate and a second area at the interface between the first parylene layer and the second polymer substrate where the first parylene layer is bonded to the second polymer substrate; and injecting a fluid into the first area formed between the first parylene layer and the second polymer substrate, wherein a hollow is formed in the first area between the first parylene layer and the second polymer substrate by the fluid injection to form a three-dimensional structure.

14. The method for manufacturing a three-dimensional structure according to claim 13, wherein the preparing the structure comprises:

forming the first polymer substrate on a carrier substrate and forming the first parylene layer on the first polymer substrate;

forming the second polymer substrate on the first parylene layer;

forming a mask pattern on the second polymer substrate;

applying plasma treatment on the second polymer substrate on which the mask pattern is formed;

removing the mask pattern; and removing the carrier substrate.

15. The method for manufacturing the three-dimensional structure according to claim 14, wherein the first polymer substrate or the second polymer substrate comprises a silicon-based elastomer material.

16. The method for manufacturing the three-dimensional structure according to claim 15, wherein the silicon-based elastomer material is polydimethylsiloxane (PDMS).

17. The method for manufacturing the three-dimensional structure according to claim 14, wherein the plasma treatment is $O_2$ and $N_2$ plasma treatment.

18. The method for manufacturing the three-dimensional structure according to claim 13, wherein the first parylene layer is a parylene layer on which a first electrode pattern is formed.

19. The method for manufacturing the three-dimensional structure according to claim 13, wherein the second polymer substrate is a polymer substrate on which a patterned second parylene layer and a second electrode pattern located on the patterned second parylene layer are formed.

* * * * *